US009290209B2

(12) United States Patent
Torii

(10) Patent No.: US 9,290,209 B2
(45) Date of Patent: Mar. 22, 2016

(54) VEHICLE BODY LOWER STRUCTURE

(75) Inventor: Nobuyuki Torii, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/386,057

(22) PCT Filed: Mar. 29, 2012

(86) PCT No.: PCT/JP2012/058446
§ 371 (c)(1),
(2), (4) Date: Sep. 18, 2014

(87) PCT Pub. No.: WO2013/145232
PCT Pub. Date: Oct. 3, 2013

(65) Prior Publication Data
US 2015/0069778 A1  Mar. 12, 2015

(51) Int. Cl.
B62D 25/20  (2006.01)
(52) U.S. Cl.
CPC ............ B62D 25/2036 (2013.01); B62D 25/20 (2013.01)
(58) Field of Classification Search
CPC ...... B62D 25/02; B62D 25/025; B62D 25/04; B62D 25/20; B62D 25/2009; B62D 25/2036; B62D 21/157
USPC ............. 296/187.08, 187.12, 193.05, 193.06, 296/203.01, 203.03, 204, 209, 29, 30
See application file for complete search history.

(56) References Cited

U.S. PATENT DOCUMENTS 5,352,011 A * 10/1994 Kihara et al. ............ 296/203.03
5,388,885 A *  2/1995 Warren .................... 296/203.03
5,820,204 A * 10/1998 Masuda et al. ........... 296/187.12
6,623,067 B2 *  9/2003 Gabbianelli et al. ......... 296/205
7,237,833 B1 *  7/2007 Moll ............................. 296/204
7,500,714 B2 *  3/2009 Abe et al. ................. 296/193.07
7,644,978 B2 *  1/2010 Tosaka et al. ............. 296/187.12
2007/0063543 A1 *  3/2007 Roccato et al. .......... 296/187.08
2009/0174220 A1 *  7/2009 Guo .......................... 296/187.12

(Continued)

FOREIGN PATENT DOCUMENTS

JP          6-211164        8/1994
JP          6-83572         11/1994
JP          2008-12996      1/2008

(Continued)

OTHER PUBLICATIONS

International Search Report issued Jun. 19, 2012, in PCT/JP2012/058446, filed Mar. 29, 2012.

Primary Examiner — Gregory Blankenship
(74) Attorney, Agent, or Firm — Oblon, McClelland, Maier & Neustadt, L.L.P.

(57) ABSTRACT

A vehicle body lower structure includes a gadget that couples a cross member and a center pillar to each other. The gadget has a first extension portion that is extended along a vertical direction, and a second extension portion that is extended from an upper end of the first extension portion toward a center axis of the center pillar, and is connected to the center pillar in the vehicle width direction. A ridgeline that extends from the cross member toward the center pillar is formed between the first extension portion and the second extension portion. The first extension portion is located only at one of a vehicle body front side of the center pillar and a vehicle body rear side of the center pillar. The second extension portion is extended at least from the upper end of the first extension portion to the center axis of the center pillar.

5 Claims, 5 Drawing Sheets

(56) References Cited

U.S. PATENT DOCUMENTS

2010/0225145 A1* 9/2010 Brunner et al. .......... 296/187.12
2010/0295335 A1* 11/2010 DeVor et al. ............. 296/187.12

FOREIGN PATENT DOCUMENTS

| JP | 2008-189137 | 8/2008 |
| JP | 2009-262615 | 11/2009 |

* cited by examiner

VEHICLE BODY LOWER STRUCTURE

TECHNICAL FIELD

The invention relates to a vehicle body lower structure.

BACKGROUND ART

As regards a vehicle body lower structure, various structures for absorbing an impact made on a vehicle body during a side collision have been adopted. For example in Patent Document 1, there is described a vehicle body lower structure that is equipped with a gadget with a U-shaped cross-section with which a cross member that is provided on a floor panel of a vehicle body is covered and which couples the cross member and a pillar of the vehicle body to each other.

It should be noted herein that FIG. 5 is a schematic cross-sectional view for explaining the shape of a gadget 51 with which a conventional vehicle body lower structure 50 is equipped. As shown in FIG. 5, the gadget 51 with which the conventional vehicle body lower structure 50 is equipped is a member that couples a pillar 60 and a cross member (not shown) to each other, and has a U-shaped cross-section that is open downward. A broken line C shown in FIG. 5 is a centerline of the pillar 60. On the gadget 51 with the U-shaped cross-section, ridgelines are formed on the right and left sides of the centerline C of the pillar 60.

RELATED ART DOCUMENT

Patent Document

Patent Document 1: Japanese Patent Application Publication No. 2009-262615 (JP-2009-262615 A)

SUMMARY OF THE INVENTION

Problem to Be Solved by the Invention

In recent years, while there have been ever increasing demands for the weight saving of vehicle bodies, there has been desired a vehicle body lower structure that enables a further reduction in weight while securing the load transmission performance for a side collision. In this respect, there is still room of improvement in the foregoing conventional vehicle body lower structure.

It is thus an object of the invention to provide a vehicle body lower structure capable of efficiently transmitting a load from a pillar to a cross member with a simple configuration, and reducing the weight of a vehicle body.

Means for Solving the Problem

In order to solve the aforementioned problem, the invention provides a vehicle body lower structure that is equipped with a coupling member that couples a cross member extending in a vehicle width direction on a floor panel of a vehicle body and a pillar extending in a vertical direction to each other. This vehicle body lower structure is characterized in that the coupling member has a first extension portion that is extended along the vertical direction, and a second extension portion that is extended from an upper end of the first extension portion toward such a direction as to approach a center axis of the pillar, as either a forward direction of the vehicle body or a rearward direction of the vehicle body, and is connected to the pillar in the vehicle width direction, that a ridgeline that extends from the cross member toward the pillar is formed between the first extension portion and the second extension portion, that the first extension portion is located only at one of a vehicle body front side of the pillar and a vehicle body rear side of the pillar, and that the second extension portion is extended at least from the upper end of the first extension portion to the center axis of the pillar.

According to the aforementioned vehicle body lower structure, the first extension portion of the coupling member is located only at one of the vehicle body front side of the pillar and the vehicle body rear side of the pillar. Therefore, in comparison with a case where a conventional coupling member with a U-shaped cross-section is provided, the configuration can be simplified, and the weight of the vehicle body can be reduced by cutting down on the material of the coupling member. Moreover, according to the aforementioned vehicle body lower structure, the load applied to the pillar due to a side collision or the like can be efficiently transmitted to the cross member through the ridgeline of the coupling member, and the strength of the vehicle body can be secured. Besides, in the aforementioned vehicle body lower structure, the second extension portion is extended to the center axis of the pillar. Therefore, the pillar can be effectively restrained from rotating around the center axis due to the load. Furthermore, in the aforementioned vehicle body lower structure, the securement of strength is made easy by increasing the thickness of a required region of the coupling member.

In the aforementioned vehicle body lower structure, the lower side of the first extension portion and the pillar may be spaced apart from each other.

According to the aforementioned vehicle body lower structure, the lower side of the first extension portion and the pillar are spaced apart from each other. Therefore, the load from the pillar is unlikely to flow to the first extension portion, so the coupling member can be restrained from being deformed from the first extension portion. Moreover, the load from the pillar mainly passes through a high-strength ridgeline region, so the load can be more efficiently transmitted to the cross member. Besides, according to the degree to which the lower side of the first extension portion is spaced apart from the pillar, the material of the coupling member can be cut down on, and the weight of the vehicle body can be reduced.

Effect of the Invention

The invention can provide a vehicle body lower structure capable of efficiently transmitting a load from a pillar to a cross member with a simple configuration, and reducing the weight of a vehicle body.

MODES FOR CARRYING OUT THE INVENTION

Hereinafter, preferred embodiments of a vehicle body lower structure according to the invention will be described in detail with reference to the drawings. Incidentally, in the respective drawings, a longitudinal direction of a vehicle body is referred to as an X-axis direction, a vehicle width direction of the vehicle body is referred to as a Y-axis direction, and a height direction of the vehicle body (a vertical direction) is referred to as a Z-axis direction.

First Embodiment

Figure 1:
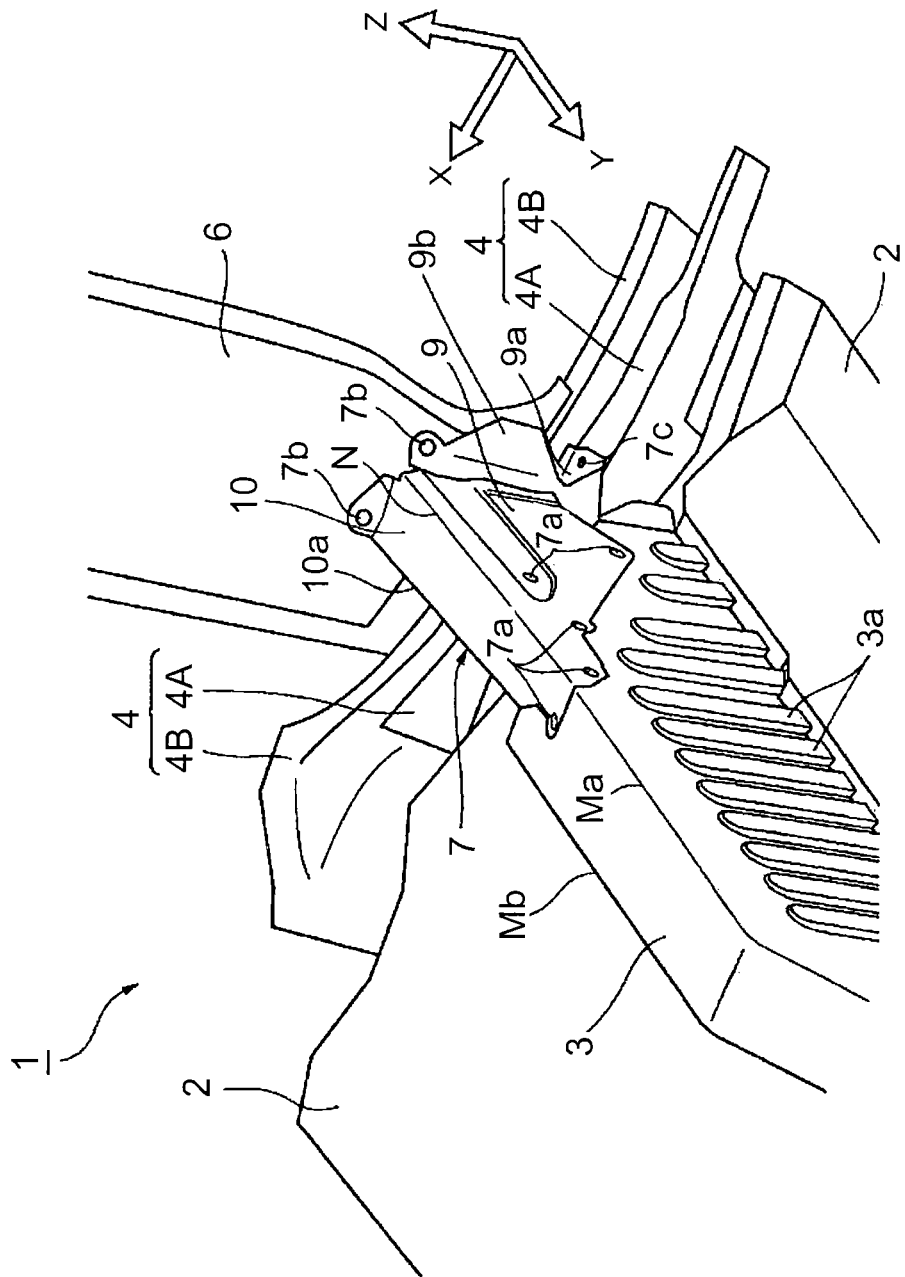
FIG. 1 is a perspective view showing a vehicle body lower structure according to a first embodiment of the invention.
Figure 2:
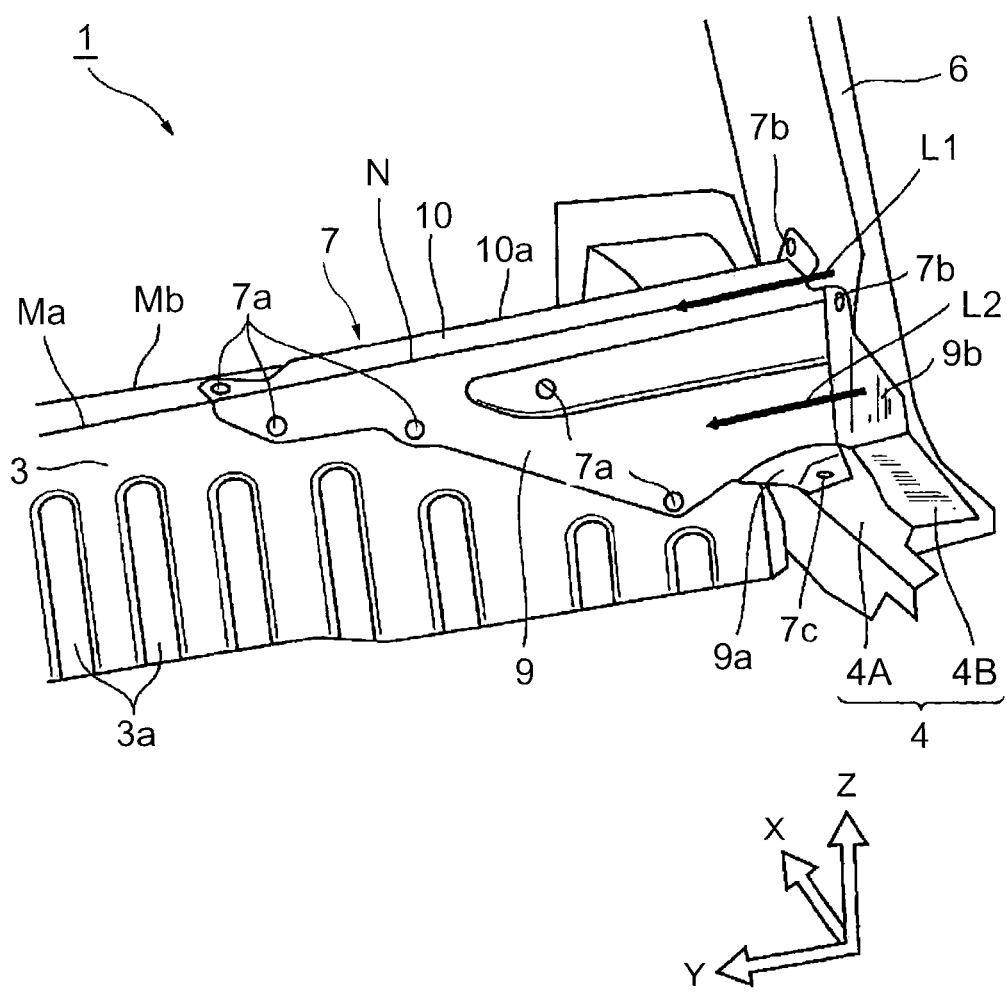
FIG. 2 is a perspective view of the vehicle body lower structure according to the first embodiment of the invention as viewed from a direction different from that of FIG. 1.

As shown in FIGS. 1 and 2, a vehicle body lower structure 1 according to the first embodiment of the invention is, for example, the structure of a lower portion of a passenger compartment of an automobile. A cross member 3 that extends in the vehicle width direction (the Y-axis direction) is disposed on a floor panel 2 that constitutes the lower portion of the passenger compartment.

The cross member 3 is a member with a U-shaped cross-section that is open downward (toward the floor panel 2 side). Two ridgelines Ma and Mb that extend along the vehicle width direction are formed on the cross member 3. A load input to a lateral portion of the vehicle body is transmitted in the vehicle width direction mainly by the ridgelines Ma and Mb of the cross member 3. A convex-concave portion 3*a* for reinforcement is formed in a lateral face of the cross member 3.

Both right and left lateral portions (the left lateral portion is not shown) of the floor panel 2 are joined to lower portions of rockers 4 that extend in the longitudinal direction (the X-axis direction) of the vehicle body, respectively. Both ends of the cross member 3 in the vehicle width direction are also joined to these rockers 4 respectively. Each of the rockers 4 has an inner rocker 4A at a vehicle body inner side (at the floor panel 2 side), and an outer rocker 4B at a vehicle body outer side.

A lower end of a center pillar 6 is connected onto the rocker 4. The center pillar 6, which extends in the vertical direction (the Z-axis direction), is located substantially at a center in the longitudinal direction of the vehicle body, and is configured as a hollow pillar by combining an outer center pillar and an inner center pillar with each other.

Figure 3:
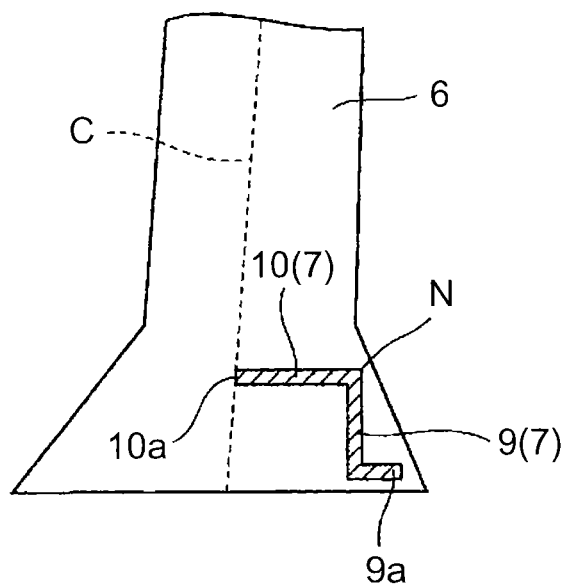
FIG. 3 is a schematic cross-sectional view for explaining the shape of a coupling member.

The cross member 3 on the floor panel 2 and the center pillar 6 are coupled to each other by a gadget (a coupling member) 7 that extends along the vehicle width direction. FIG. 3 is a schematic cross-sectional view for explaining the shape of the gadget 7.

It should be noted herein that a broken line shown in FIG. 3 is a center axis of the center pillar 6. The center axis C is equivalent to an axis that serves as the center of rotational deformation of the center pillar 6 when the vehicle body receives a load laterally due to a side collision or the like. Alternatively, the center axis C may be an axis that substantially passes through the center of the center pillar 6 in the width direction as viewed from the vehicle width direction.

As shown in FIGS. 1 to 3, the gadget 7 is a member that extends along the vehicle width direction, and couples the cross member 3 and the center pillar 6 to each other in the vehicle width direction. The gadget 7 is a member with an L-shaped cross-section that is constituted of a first extension portion 9 that is extended in the vertical direction, and a second extension portion 10 that is extended forward of the vehicle body from an upper end of the first extension portion 9.

A ridgeline N that extends from the cross member 3 toward the center pillar 6 is formed between the first extension portion 9 and the second extension portion 10. The ridgeline N extends along the vehicle width direction, and is formed slightly apart from the center pillar 6.

The gadget 7 with an L-shaped cross-section is coupled in such a manner as to cover a vehicle body rear portion side of the cross member 3. Hole portions 7*a* for bolting are formed through the gadget 7. The gadget 7 is bolted through the hole portions 7*a*, and is thereby fixed to the cross member 3. The gadget 7 is arranged such that the ridgeline N of the gadget 7 coincides with one of the two ridgelines Ma and Mb of the cross member 3, more specifically, the ridgeline Ma at the vehicle body rear side.

The first extension portion 9 is a member that forms a lateral face of the gadget 7, and is connected to the cross member 3, the rocker 4, and the center pillar 6. The first extension portion 9 has a leg portion 9*a* that is connected to the rocker 4, and a pillar connection portion 9*b* that is connected to the center pillar 6.

The leg portion 9*a* is provided at a lower end of the first extension portion 9 at the rocker 4 side, and is formed bent along an upper face of the rocker 4. The leg portion 9*a* is fixed to the upper face of the rocker 4 by fastening a bolt via a hole portion 7*c* at the center.

The pillar connection portion 9*b* is provided at an end of the first extension portion 9 on the center pillar 6 side, and is formed bent along the center pillar 6. The pillar connection portion 9*b* is fixed to the center pillar 6 by fastening bolts via hole portions 7*b*.

The second extension portion 10 is a region that is extended forward of the vehicle body from an upper end of the first extension portion 9. The second extension portion 10 is connected at one end thereof in the vehicle width direction to the center pillar 6, and is connected at the other end thereof in the vehicle width direction to the cross member 3.

As shown in FIG. 3, the flat plate-like second extension portion 10 is extended in such a direction as to approach the center axis C of the center pillar 6 from the first extension portion 9, as viewed from the vehicle width direction. A tip 10*a* of the second extension portion 10 reaches the center axis C of the center pillar 6, and is connected to the center pillar 6. No bend or the like is provided, and no ridgeline is formed at the tip 10*a* side of the second extension portion 10. Incidentally, the second extension portion 10 is extended in such a manner as to reach a position beyond the center axis C of the center pillar 6 (a position in front of the center axis C with respect to the vehicle body) as viewed from the first extension portion 9.

Figure 5:
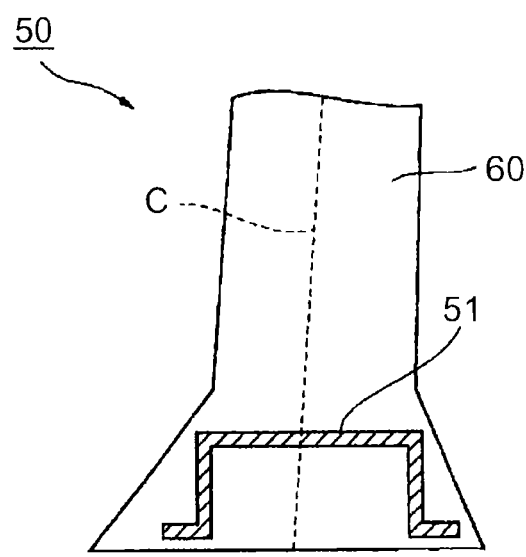
FIG. 5 is a schematic cross-sectional view for explaining the shape of a coupling member in a conventional vehicle body lower structure.

In accordance with the vehicle body lower structure 1 according to the first embodiment of the invention described above, the first extension portion 9 of the gadget 7 is provided at the vehicle body rear side of the center pillar 6 as the only first extension portion. Therefore, in comparison with a case where a conventional gadget with a U-shaped cross-section shown in FIG. 5 is provided, the configuration can be simplified, and the weight of the vehicle body can be reduced by cutting down on the material of the gadget 7. Moreover, according to the vehicle body lower structure 1, the load applied to the center pillar 6 due to a side collision or the like can be efficiently transmitted to the cross member 3 through the ridgeline of the gadget 7, and the strength of the vehicle body can be secured. That is, in the case where a load is input laterally of the vehicle body, a reactive force for the load flowing on the ridgeline of the center pillar 6 can be taken on the ridgeline N of the gadget 7, and a reactive force for the load flowing at a belly portion of the center pillar 6 (in the vicinity of the center axis C) can be taken at the second extension portion 10, so there is no superfluous region. Therefore, the securement of strength is made easy by increasing the thickness of a required region of the gadget 7.

Furthermore, in the vehicle body lower structure 1, the second extension portion 10 of the coupling member 7 is extended to reach the center axis C of the center pillar 6. Therefore, the center pillar 6 can be effectively restrained from rotating around the center axis C due to the load, and the strength of the vehicle body is advantageously secured.

Second Embodiment

Figure 4:
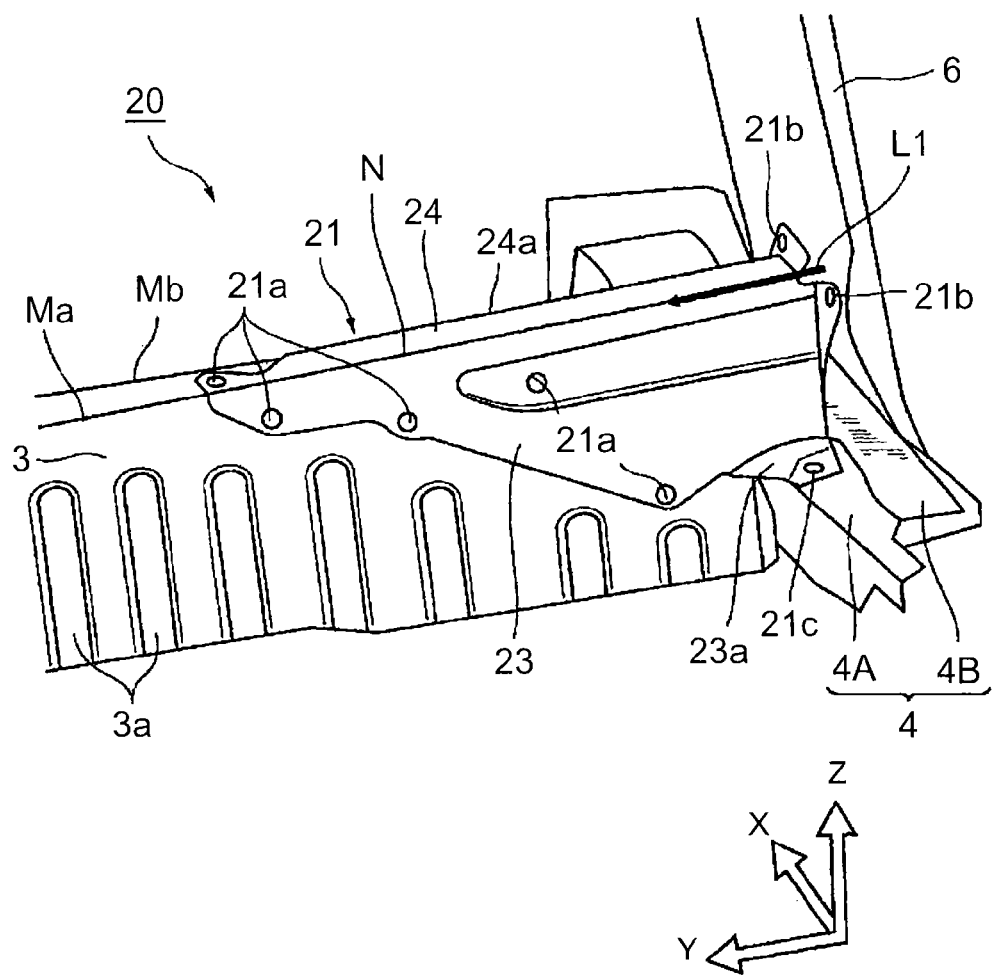
FIG. 4 is a perspective view showing a vehicle body lower structure according to a second embodiment of the invention.

As shown in FIG. 4, a vehicle body lower structure 20 according to the second embodiment of the invention is different from the vehicle body lower structure 1 according to the first embodiment of the invention only in that the center pillar 6 and part of a first extension portion 23 of a gadget 21 are spaced apart from each other. In addition, members and regions identical or equivalent to those of the first embodiment of the invention are denoted by the same reference symbols respectively, and redundant description thereof will be omitted. Besides, a second extension portion 24 according to the second embodiment of the invention is also identical in configuration to the second extension portion 10 according to the first embodiment of the invention, so redundant description thereof will be omitted.

Specifically, the rocker 4 side (the lower side) of the first extension portion 23 of the gadget 21 according to the second embodiment of the invention is formed apart from the center pillar 6. That is, the pillar connection portion 9b of the first extension portion 9 according to the first embodiment of the invention is not formed at the first extension portion 23 according to the second embodiment of the invention.

The first extension portion 23 is connected only on an upper side thereof (the second extension portion 24 side) to the center pillar 6. Therefore, no load is directly transmitted from the center pillar 6 to the rocker 4 side of the first extension portion 23 unless this rocker 4 side of the first extension portion 23 is deformed. That is, the gadget 21 can prevent a load from being directly transmitted from the center pillar 6 to a belly portion of the gadget 21 (a lower region of the first extension portion 23) with relatively low strength.

According to the vehicle body lower structure 20 according to the second embodiment of the invention described above, the rocker 4 side of the first extension portion 23 and the center pillar 6 are spaced apart from each other. Therefore, the load from the center pillar 6 is unlikely to flow to the first extension portion 23, and the gadget 21 can be restrained from being deformed from the first extension portion 23. Moreover, the load from the center pillar 6 mainly passes through the ridgeline N with high strength. Therefore, the load can be more efficiently transmitted to the cross member 3. Besides, according to the degree to which the rocker 4 side of the first extension portion 23 is spaced apart from the center pillar 6, the material of the gadget 21 is cut down on, and the weight of the vehicle body is reduced.

The invention is not limited to the aforementioned embodiments thereof. For example, the gadget with the L-shaped cross-section may be arranged such that the ridgeline is located at the vehicle body front side of the center axis of the center pillar. In this case, the first extension portion is located at the vehicle body front side of the center pillar, and the second extension portion is extended rearward of the vehicle body from the upper end of the first extension portion. Incidentally, the gadget is not absolutely required to have an L-shaped cross-section. In addition, the entire shape, size, arrangement and the like of the gadget are also not limited to those described above.

Besides, the shapes and the like of the center pillar, the rockers, the cross member and the floor panel are also not limited to those described above. The pillar to which the gadget is coupled is not absolutely required to be the center pillar.

INDUSTRIAL APPLICABILITY

The invention is available for a vehicle body lower structure.

DESCRIPTION OF REFERENCE SYMBOLS 1, 20 . . . VEHICLE BODY LOWER STRUCTURE
2 . . . FLOOR PANEL
3 . . . CROSS MEMBER
4 . . . ROCKER
4A . . . INNER ROCKER
4B . . . OUTER ROCKER
6 . . . CENTER PILLAR
7, 21 . . . GADGET (COUPLING MEMBER)
7a, 7b . . . HOLE PORTION
9, 23 . . . FIRST EXTENSION PORTION
9a, 23a . . . LEG PORTION
9b . . . PILLAR CONNECTION PORTION
10, 24 . . . SECOND EXTENSION PORTION
10a, 24a . . . TIP
50 . . . CONVENTIONAL VEHICLE BODY LOWER STRUCTURE
51 . . . CONVENTIONAL GADGET
C . . . CENTER AXIS
Ma, Mb . . . RIDGELINE
N RIDGELINE

The invention claimed is:

1. A vehicle body lower structure comprising:
a floor panel of a vehicle body;
a cross member extending in a vehicle width direction on the floor panel;
a pillar extending in a vertical direction; and
a coupling member that couples the cross member and the pillar to each other, wherein
the coupling member has
a first extension portion that is extended along the vertical direction,
a second extension portion that is extended from an upper end of the first extension portion in a direction toward a center axis of the pillar, and is connected to the pillar in the vehicle width direction, the direction being either a forward direction of the vehicle body or a rearward direction of the vehicle body, and
a leg portion that is fixed to an upper face of a rocker of the vehicle body,
the coupling member has an L-shaped cross-section in a side view of the vehicle body lower structure,
a ridgeline of the coupling member that extends from the cross member toward the pillar is formed between the first extension portion and the second extension portion,
the first extension portion is located only on one of a vehicle body front side of the pillar and a vehicle body rear side of the pillar, and
the second extension portion is extended at least from the upper end of the first extension portion to the center axis of the pillar.

2. The vehicle body lower structure according to claim 1, wherein
a lower side of the first extension portion and the pillar are spaced apart from each other.

3. The vehicle body lower structure according to claim 1, wherein no extension potion extended along the vertical direction is located on the other one of the vehicle body front side of the pillar and the vehicle body rear side of the pillar.

4. The vehicle body lower structure according to claim 1, wherein the ridgeline of the coupling member coincides with a ridgeline of the cross member.

5. The vehicle body lower structure according to claim 1, wherein a tip of the second extension portion reaches the center axis of the pillar and is connected to the pillar.

* * * * *